United States Patent [19]

Ludwig

[11] 4,156,518
[45] May 29, 1979

[54] ELECTRIC VACUUM VALVE

[75] Inventor: George Ludwig, Owosso, Mich.

[73] Assignee: Tom McGuane Industries, Inc., Madison Heights, Mich.

[21] Appl. No.: 828,532

[22] Filed: Aug. 29, 1977

[51] Int. Cl.² ............................................. F16K 31/02
[52] U.S. Cl. .................................. 251/11; 236/68 R; 236/101 E; 338/22 R
[58] Field of Search ........... 251/11; 236/68 R, 101 E, 236/48 R; 338/22 R; 92/98 R; 339/275 R

[56] References Cited

U.S. PATENT DOCUMENTS

| | | | |
|---|---|---|---|
| 1,923,882 | 8/1933 | Pickup | 236/101 E |
| 3,583,289 | 6/1971 | Wilson et al. | 92/98 R |
| 3,804,326 | 4/1974 | McIntire | 236/101 E |
| 3,856,259 | 12/1974 | Doherty, Jr. | 236/48 R |
| 3,868,620 | 2/1975 | McBride, Jr. et al. | 338/22 R |
| 3,916,264 | 10/1975 | Berg | 338/22 R |
| 4,027,848 | 6/1977 | Mundil | 236/101 E |

Primary Examiner—Arnold Rosenthal
Attorney, Agent, or Firm—Barnes, Kisselle, Raisch & Choate

[57] ABSTRACT

An electric vacuum valve comprising a body including a chamber having a first passage adapted to be connected to a source of vacuum, a valve seat in the chamber, a bi-metallic disc associated with the valve seat and operable to close the first passage and a second passage to the exterior of said body. A PTC disc is positioned in the chamber adjacent the bi-metallic disc and includes a first terminal connected to one side thereof and extending exteriorly of the body and a second terminal connected to the other side thereof and extending externally of the body such that heat from the PTC disc functions to radiate toward the bi-metallic disc when power is applied to said terminals to cause the bi-metallic disc to seat against the valve seat and when power is terminated, the bi-metallic disc cools and moves away from the valve seat.

17 Claims, 4 Drawing Figures

ELECTRIC VACUUM VALVE

This invention relates to electric vacuum valves.

BACKGROUND AND SUMMARY OF THE INVENTION

In the use of vacuum for performing various functions, for example, in operating parts in an automotive vehicle, it is desirable to insure that the vacuum will function only when the automotive vehicle engine is functioning.

Accordingly among the objects of the invention are to provide a reliable, efficient electric valve which will function to insure that vacuum will be transmitted to the device being operated only when the vehicle engine is being operated.

DESCRIPTION

Figure 1:
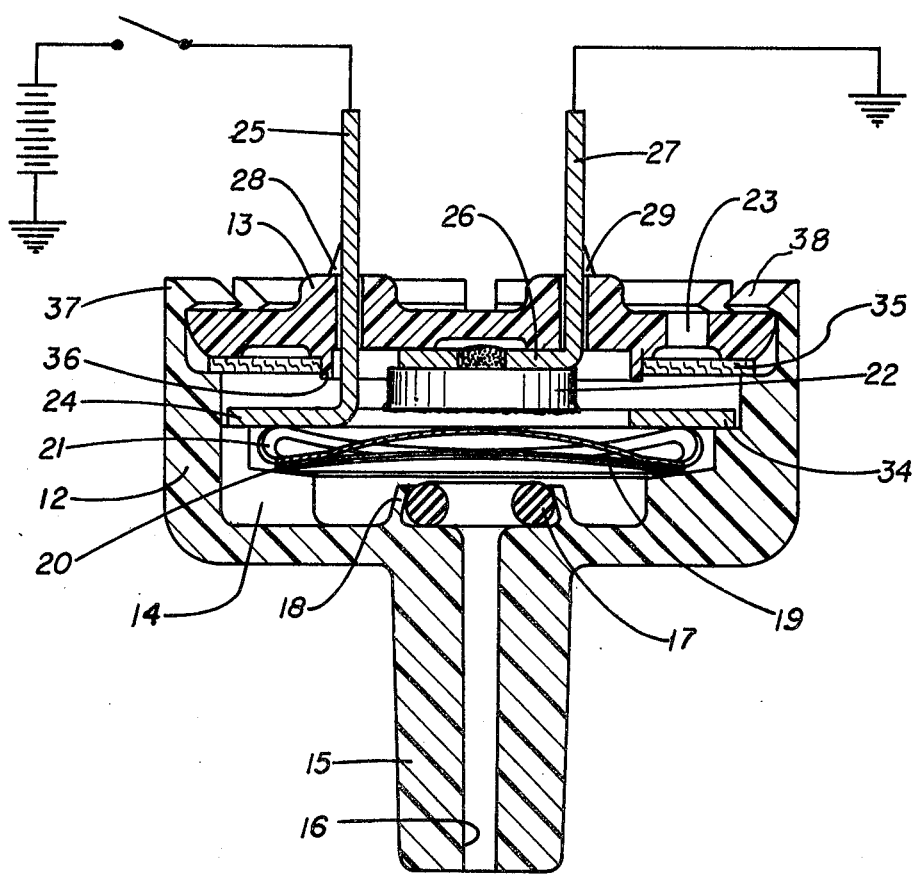
FIG. 1 is a longitudinal sectional view of the electric vacuum valve showing the electrical connections diagrammatically.

Referring to FIGS. 1–4, the electric vacuum valve 10 embodying the invention comprises a body 11 including a first part 12 and a second part 13 which are interengaged to define a chamber 14. The parts 12, 13 are made of plastic such as nylon. Part 12 includes an axial projection 15 having a first passage 16 communicating with the chamber 14. A valve seat is defined by rubber O-ring 17 held in position by an integral annular flange 18 that extends radially and axially inwardly.

A bi-metallic disc 19 is associated with the valve seat defined by O-ring 17 and has its periphery engaging a first shoulder 20 on body 11. A wave washer or spring 21 urges the bi-metallic disc 19 generally toward the shoulder 20.

A PTC disc 22 is mounted adjacent the disc 19 but in spaced relationship thereto so that heat radiating therefrom will cause the disc 19 to snap against the valve seat 17 and thereby prevent air from passing from a second passage 23 in part 13 through the chamber 14 and out through passage 16.

The terminal or electrical connections to the PTC disc 22 are made by a first terminal 24 in the form of a plate that is soldered to one side of the PTC disc 22 and has a leg 25 extending through a passage in part 13 to the exterior and a second terminal in the form of a plate 26 fastened to the other side of PTC disc 22 and having a leg 27 extending to the exterior. The legs 25, 27 include barbs 28, 29 that engage the outer surface of bosses in the part 13 to locate the PTC disc 22 axially relative to the passage 16 and away therefrom.

Figure 3:
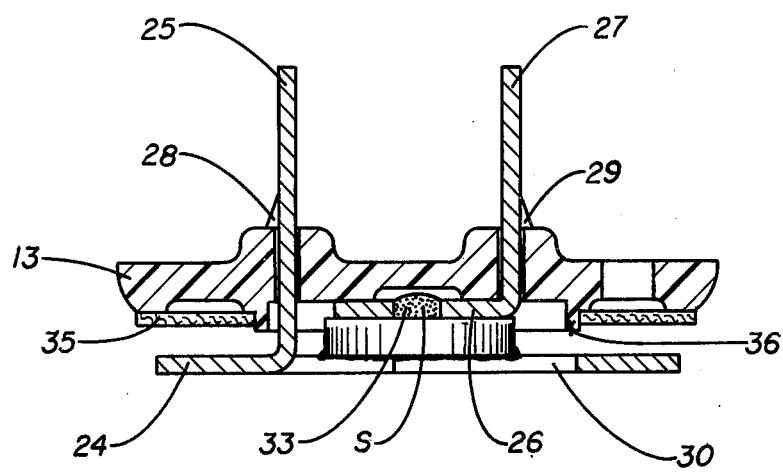
FIG. 3 is a sectional view taken of a portion of the valve in FIG. 1.
Figure 4:
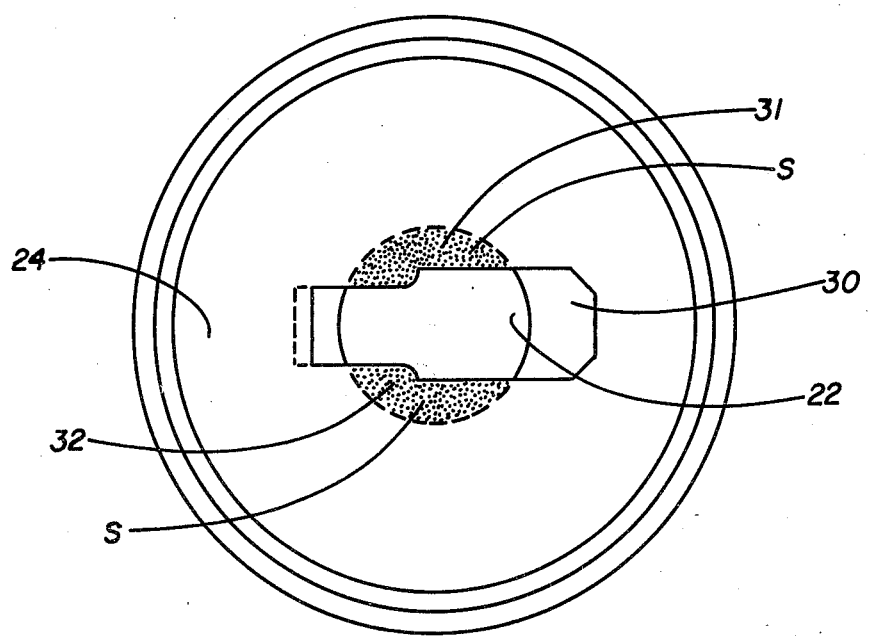
FIG. 4 is a bottom plan view of the portion of the valve shown in FIG. 3.

As shown in FIG. 3, the disc 24 is formed with an elongated key-shaped opening 30 that has a greater length than the diameter of the surfaces of the interface between the disc 22 and the disc 24.

The disc 26 is fastened to the PTC disc 22 by solder S filling the opening 33 that has a cross sectional area less than the other surface of the PTC disc 22.

As further shown in FIG. 1, the terminal 24 engages a shoulder 34 in the chamber 14 and spring 21 urges the disc 19 against the shoulder 20.

Figure 2:
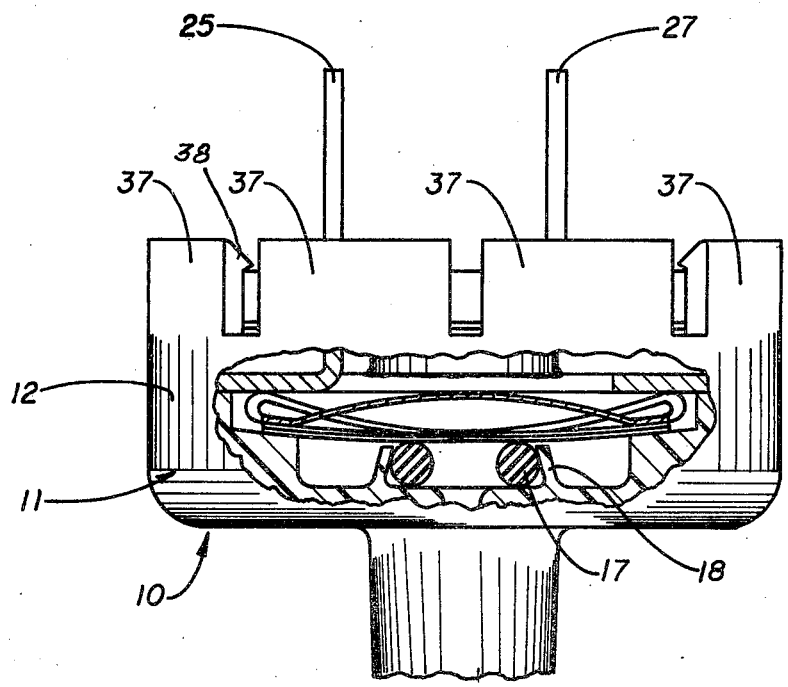
FIG. 2 is a part sectional elevational view of an electric vacuum valve embodying the invention.

When power is applied to the terminals 25, 27, (FIG. 1) by closing of switch indicating that the engine of the vehicle is operating, heat radiates from PTC disc 22 causing the bi-metallic disc 19 to snap to a closed position as shown in FIG. 2 preventing a venting of vacuum which is being applied to another device connected to passage 16. When the engine is stopped, the electrical connection to terminals 25, 27 is broken permitting the bi-metallic disc 19 to snap back to the position shown in FIG. 1 permitting communication from the exterior passage 23 through the passage 16 to the vacuum operating device.

A filter 35 in the form of an annular disc is provided over the passage 23 and is held in centered position overlying opening 23 by an axial wall 36 extending through the center of the filter.

To facilitate assembly of parts 12, 13 of body 11, the periphery of part 12 is provided with circumferentially spaced axially extending fingers or projections 37, each formed with a radial rib 38. Part 13 is forced axially inwardly to spring fingers 37 outwardly and to snap behind rib or portions 37.

I claim:

1. An electric vacuum valve comprising
    a body including a chamber having a first passage adapted to be connected to a source of fluid,
    a valve seat in said chamber,
    a bi-metallic disc associated with said valve seat and operable to close said first passage,
    a second passage to the exterior of said body,
    a PTC disc positioned in said chamber adjacent said bi-metallic disc and including a first terminal connected thereto and extending exteriorly of said body and a second terminal connected to said PTC disc and extending externally of said body such that heat from said PTC disc functions to radiate toward said bi-metallic disc when power is applied to said terminals to cause said bi-metallic disc to move in one direction relative to said seat and when power is terminated, said bi-metallic disc cools and moves in the opposite direction relative to said seat,
    said second terminal comprising a plate fastened to another surface of said PTC disc,
    said plate including an opening having a lesser cross sectional area than the surface of said disc and solder filling said opening and fastening said plate to said disc.

2. The combination set forth in claim 1 wherein said body includes a shoulder which is engaged by said bi-metallic disc.

3. The combination set forth in claim 2 wherein said body includes a second shoulder engaged by said first terminal.

4. The combination set forth in claim 1 wherein said valve seat comprises an O-ring,
    said body including means for locating said O-ring adjacent said first passage.

5. The combination set forth in claim 1 including a filter associated with said second passage.

6. The combination set forth in claim 5 wherein said filter is annular and said body includes an annular wall extending through and locating said annular filter.

7. The combination set forth in claim 1 wherein said body is made of two parts which are interengaged, one part including said first passage on said valve seat and the other part including said second passage.

8. The combination set forth in claim 7 wherein said two parts of said body are interengaged by a snap action thereof.

9. The combination set forth in claim 7 wherein said first part of said body includes a plurality of circumferentially spaced axially extending projections having inwardly extending radial portions,
said second part being adapted to snap behind said radial portions.

10. The combination set forth in claim 1 including a wave washer functioning as a spring between said first terminal and said bi-metallic disc to urge said disc in the general direction of said valve seat.

11. An electric vacuum valve comprising
a plastic body including a chamber having a first passage adapted to be connected to a source of vacuum,
a valve seat in said chamber,
a bi-metallic disc associated with said valve seat and operable to close said first passage,
a second passage to the exterior of said body,
a PTC disc positioned in said chamber adjacent said bi-metallic disc and including a first terminal connected thereto and extending exteriorly of said body and a second terminal connected to said PTC disc and extending externally of said body such that heat from said PTC disc functions to radiate toward said bi-metallic disc when power is applied to said terminals to cause said disc to seat against said valve seat and when power is terminated, said bi-metallic disc cools and moves away from said valve disc,
said first terminal comprising a first plate fixed to one surface of said PTC disc,
said plate including an opening,
said first plate being soldered to said disc along the edges of said opening,
said second terminal comprising a second plate fastened to another surface of said PTC disc,
said plate including an opening having a lesser cross sectional area than the surface of said disc and solder filling said opening and fastening said second plate to said disc,
said body including a shoulder which is engaged by said bi-metallic disc,
said valve seat comprising an O-ring,
said body including means for locating said O-ring adjacent said first passage,
said body including a second shoulder engaged by said first terminal.

12. The combination set forth in claim 11 including a filter associated with said second passage.

13. The combination set forth in claim 12 wherein said filter is annular and said body includes an annular wall extending through and locating said annular filter.

14. The combination set forth in claim 13 wherein said body is made of two parts which are interengaged,
one part including said first passage on said valve seat and the other part including said second passage.

15. The combination set forth in claim 14 wherein said two parts of said body are interengaged by a snap action thereof.

16. The combination set forth in claim 15 wherein said first part of said body includes a plurality of circumferentially spaced axially extending projections having inwardly extending radial portions,
said second part being adapted to snap behind said radial portions.

17. The combination set forth in claim 16 including a wave washer functioning as a spring between said first terminal and said bi-metallic disc to urge said disc in the general direction of said valve seat.

* * * * *